United States Patent [19]

Smith, 2nd

[11] 4,184,157
[45] Jan. 15, 1980

[54] IDENTIFICATION TONE RECONSTITUTION IN A TIME SHARED NAVIGATIONAL RECEIVER

[75] Inventor: Frank P. Smith, 2nd, Dresher, Pa.

[73] Assignee: Narco Scientific, Inc., Fort Washington, Pa.

[21] Appl. No.: 876,096

[22] Filed: Feb. 8, 1978

[51] Int. Cl.² ............................................. G01S 1/14
[52] U.S. Cl. .......................... 343/108 R; 343/106 R; 343/109
[58] Field of Search ............... 343/106 R, 108 R, 109

[56] References Cited
U.S. PATENT DOCUMENTS 3,689,925  9/1972  Hulland ........................... 343/105 R Primary Examiner—Maynard R. Wilbur
Assistant Examiner—Richard E. Berger
Attorney, Agent, or Firm—Paul & Paul

[57] ABSTRACT

In an information receiving apparatus having a time-shared mode of operation for simultaneously receiving a plurality of information carrying signals, at least one signal of which includes an identification tone superimposed thereupon, a tone reconstitution scheme for providing a continuous tone from a received tone signal which contains absences of tone signal due to the time-shared partial duty dedication of the receiver to that signal and its superimposed tone.

9 Claims, 5 Drawing Figures

IDENTIFICATION TONE RECONSTITUTION IN A TIME SHARED NAVIGATIONAL RECEIVER

BACKGROUND OF THE INVENTION

This invention relates to navigational receivers in general, and in particular, to an avionics system for receiving OMNI mode VOR signals, ILS localizer signals (LOC) and ILS glide slope signals (GS) on a time-shared multiplexed basis.

Instrument landing systems (ILS) are utilized as navigational aids to landing. ILS includes three basic ground station signals: (1) localizer signals (LOC): (2) glide slope signals (GS); and (3) marker signals. The LOC defines a vertical plane of radiation created by generated signals which permit an aircraft to align with the centerline of a runway. A received amplitude balance establishes this centerline. GS defines the proper angle from an initial approach plane to the plane of the runway which will enable the aircraft to make a proper landing, typically an angle of 3°. Equal 90 Hz and 150 Hz amplitude modulation components provide an indication the aircraft is at the desired slope angle of 3.0°. The 150 Hz output predominates below the glide slope while the 90 Hz output predominates above the glide slope. An amplitude comparator determines whether the aircraft is below or above the desired glide path. Marker signals are simple 75 MHz narrow profile signals, vertically, projected, which intercept an aircraft passing overhead, indicating position.

Most commonly, a transmitter identification signal is superimposed on the LOC signal. This identification signal is in Morse Code to give the identification code in "dots" and "dashes" for a ground station.

In the past, separate and distinct avionics systems were developed to process each separate signal within the aircraft navigational system. As such, VOR/LOC signals are received exclusively by a dedicated antenna and handled exclusively through a separate RF amplifier, RF mixer, IF filter, IF amplifier, detector, buffer, converter and display. Similarly, GS signals were received exclusively by a dedicated antenna and handled exclusively through another separate RF amplifier, RF mixer, IF filter, IF amplifier, detector, buffer, converter and display.

As there is a duplication of components such as IF filter, IF amplifier, detector, buffer and tone filters when separate and distinct systems are used, it is possible to time-share process VOR/LOC and GS signals through commonly dedicated IF filter, IF amplifier, detector, buffer and tone filter (intermediate components) on a multiplexed operational basis. Such a multiplex receiver system, could utilize a multiplex control circuit to control the operation of the navigational receiver dual front end for multiplexing signals coming from a separate VOR/LOC front end and a separate GS front end into the shared intermediate components and controlling the operation of dual output display circuits, demultiplexing signals coming through the intermediate components into the exclusively dedicated output display circuits.

Multiplex processing in such a system would occur regardless of the desires of the pilot/navigators. It is also, however, desirable to verify the identity of a ground station, this being done by the pilot who must listen to the Morse Code signal which has been superimposed upon the LOC signal. As all Morse, "dots" and "dashes" are transmitted at a frequency of 1020 Hz for periods of 100 MS and 300 MS, respectively, this tone frequency will be interrupted due to the time-shared multiplex operation of the receiver, thus, rendering it unrecognizable to the pilot.

An objective of this invention is to provide a keyed identification tone extraction scheme for use in a multiplex operated navigational receiver.

Another objective of this invention is to provide a scheme for reconstituting an identification tone extracted whereby discontinuities in the tone signal are filled in.

SUMMARY OF THE INVENTION

A navigational receiver is provided having a multiplexed mode of operation wherein both LOC and GS signals are processed by common components situated between dual front end and dual output signal processing circuits, the multiplex and demultiplex operation being controlled by a multiplex control circuit. The extraction and reconstitution of an identification code which is superimposed upon only one of the signals received, such as LOC, may be performed.

An LOC transmitter regularly transmits its "letter" (identification) in Morse Code at a tone frequency of 1020 Hz with a "dot" duration of 100 milliseconds and a "dash" duration of 300 milliseconds. A gated digital filter may be employed within the receiver to perform multiphase amplitude sensing wherein the sampling period may be about one-third of a normal dot duration period and may alternately free run according to the time-shared multiplexed operation of the receiver.

A smoothing component, possibly a low pass filter, may be engaged to create an output tone with less harmonic distortion.

DETAILED DESCRIPTION OF THE DRAWINGS

The advantages, features and operation of this invention will best be understood from a reading of the following detailed description of the invention in conjunction with the attached drawings in which like numerals refer to like elements and in which.

DETAILED DESCRIPTION OF THE INVENTION

A VOR/LOC receiver and a glide slope receiver are incorporated into a single navigational unit, the various navigational signals being processed on a time-shared multiplexed basis to provide simultaneous displays of each as well as an audio output of Morse Code station identification to the pilot.

Figure 1:
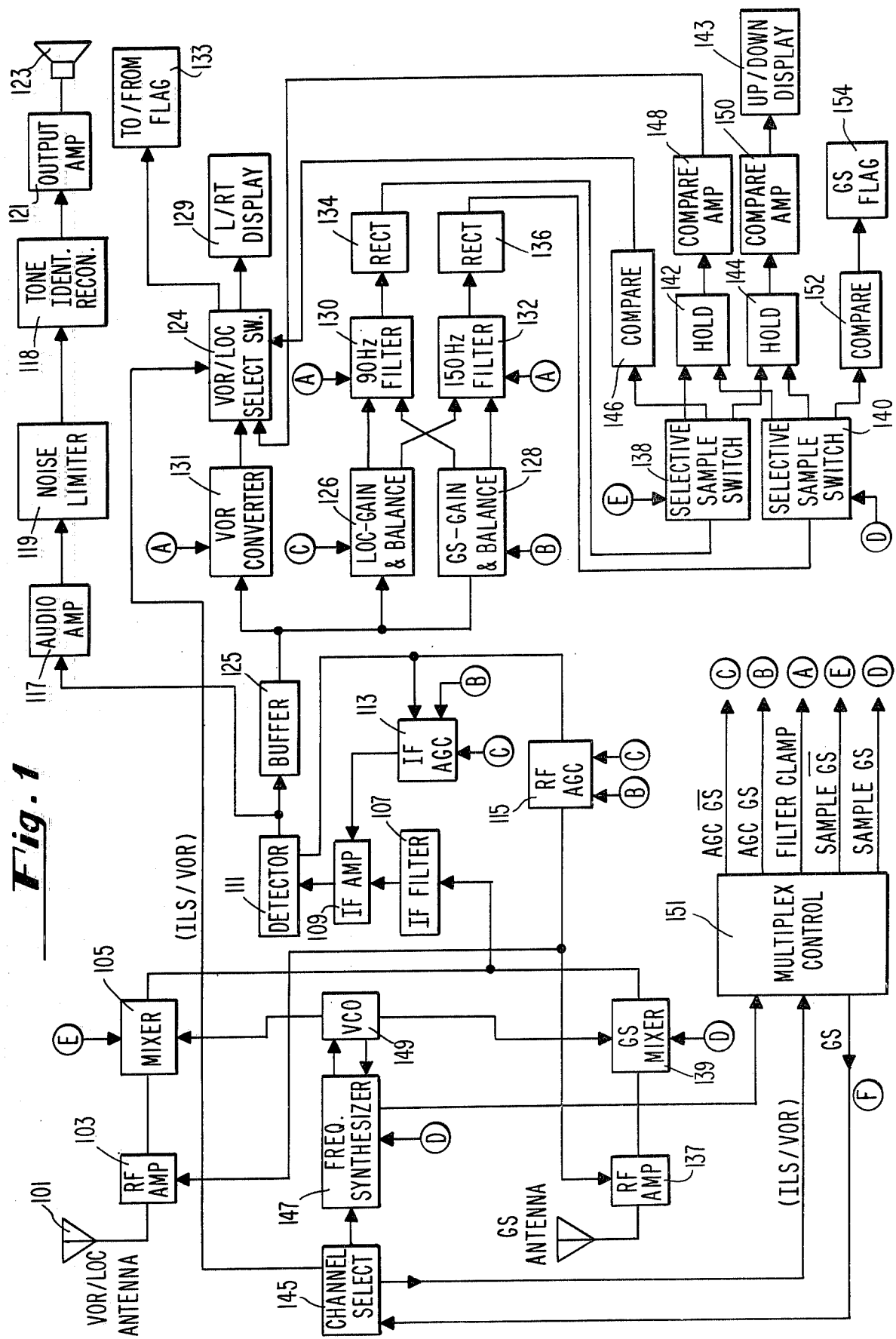
FIG. 1 is a block diagram of the time-shared multiplex navigational unit with tone identification and reconstitution circuitry.

Referring to FIG. 1, navigation antenna 101 receives VOR/LOC information. This information is processed through an RF amplifier 103 and sent on to a LOC RF mixer 105. An IF filter 107 is connected to the output of this mixer 105 while an IF amplifier 109 is connected to the output of the filter 107. A detector 111 has its input connected to the output of the IF amplifier 109. An automatic gain control (AGC) is utilized for both the IF and RF stages wherein a feedback loop exists from the detector 111 via an IF AGC component 113 to the IF amplifier 109 and a feedback loop exists from the detector 111 to the RF amplifier 103 via an RF AGC component 115.

The output of the detector 111 is fed to an audio amplifier 117, then to a noise limiter 119, and then to a tone identification and reconstitution component 118, and to an output amplifier 121 which drives an earphone or speaker amplifier 123.

The output from the detector 111 is also fed to a buffer 125 whose output is connected to a VOR converter 131 which is connected to a VOR/LOC select switch 124 and then to a "left/right" display 129. The output from the buffer 125 is also connected to an LOC gain and balance component 126 and a GS gain and balance component 128.

Gated outputs from the LOC gain and balance component 126 and the GS gain and balance component 128 are each connected to a 90 Hz filter 130 and a 150 Hz filter 132, and then to respectively connected rectifiers 134, 136.

A first selective sample switch 130 receives information from the 90 Hz signal rectifier 134 while a second selective sample switch 140 receives information from the 150 Hz signal rectifier 136. An output from each of these switches 138, 140 is connected to each of a first and second "hold" (storage) components 142, 144.

A third output from the first selective sample switch 138 is tied to a threshold comparison amplifier 146, its output being tied to the VOR/ILS controlled switches 124.

A second comparison amplifier 148 is connected to the first hold component 142, its output being tied into the VOR/ILS controlled switches 124.

A third comparison amplifier 150 is connected to the second hold component 144, its output being used to drive an "up/down" display 143.

The second selective sample switch 140 also has a third output which is fed to another comparison amplifier 152 for driving a GS flag ("unsafe") 154 display.

Glide slope information processed by the receiver output components described above may be received via GS antenna connected to GS RF amplifier 137. Connected to the output of the RF amplifier 137 is a GS mixer 139. The output of the GS mixer 139 is connected to an input of the IF filter 107 described above, and is in common with the output from the LOC mixer 105.

The RF AGC 115 feedback lines to the LOC RF amplifier 103 is also tied to the GS RF amp 137.

A channel selection control 145 can be employed to affect the operation of a frequency synthesizer 147 which in turn drives a voltage controlled oscillator (VCO) 149. Outputs from the voltage controlled oscillator 149 provide a local oscillator frequency signal (L.O.) to the LOC mixer 105 as well as to the GS mixer 139.

A multiplex control circuit 151 provides command signals for alternating the dedication of the common circuitry between the LOC mode and the GS mode and for directing the time-sharing within the entire receiver. It is disabled in VOR mode.

Multiplex control circuit 151 provides six basic control signal commands for operating the receiver. These command signals include a filter clamp command "A"; and AGC-GS command "B"; and AGC-$\overline{GS}$ command "C"; a sample GS command "D"; a sample $\overline{GS}$ command "E"; and a GS command "F", where "GS" signifies the total time devoted to glide slope reception and "$\overline{GS}$" signifies any time not devoted to glide slope, i.e., to localizer. A time-share enable/disable signal indicating ILS or VOR operation, respectively, is desired and the multiplex control circuit 151 from the channel select 145. The GS command signal is fed from the multiplex control 151 to the channel select 145 for synchronizing the control and therefore the change of operation of the frequency synthesizer 147 with the change of function between LOC and GS as generated by the multiplex control circuit 151.

The timing operation of the multiplex control circuit 151 is derived from a basic 50 KHz pulse train (clock) derived within the frequency synthesizer 147.

Multiplex control 151 output command signals "A," "B," "C," "D," "E," "F" timing pulses are distributed through out the navigational receiver unit as follows: filter clamp "A" to VOR converter 131, 90 Hz filter 130 and 150 Hz filter 132; AGC GS "B" to IF-AGC 113, RF-AGC 115, GS gain and balance circuit 128; AGC-$\overline{GS}$ "C" to IF-AGC113, RF-AGC115, LOC gain and balance circuit 126; sample GS "D" to frequency synthesizer 147, GS mixer 139, second selective sample switch 140; sample GS "E" to LOC mixer 105, first selective sample switch 138; glide slope duty cycle GS "F" to channel select 145.

The time-share enable/disable (VOR,ILS) is also fed to the VOR/LOC select switch 124 from the channel select. This (VOR,ILS) activates the switch 124 to pass LOC information or OMNI mode. VOR information to the "left/right" and "to/from" display 123 as a function of the channel selection 145 being tuned to a LOC or VOR channel, respectively.

The time-share enable/disable (VOR,ILS) is also fed to the VOR/LOC select switch 124 from the channel select. This (VOR,ILS) activates the switch 124 to pass LOC information of OMNI mode. VOR information to the "left/right" and "to/from" display 123 is a function of the channel selection 145 being tuned to a LOC or VOR channel, respectively.

Figure 2:
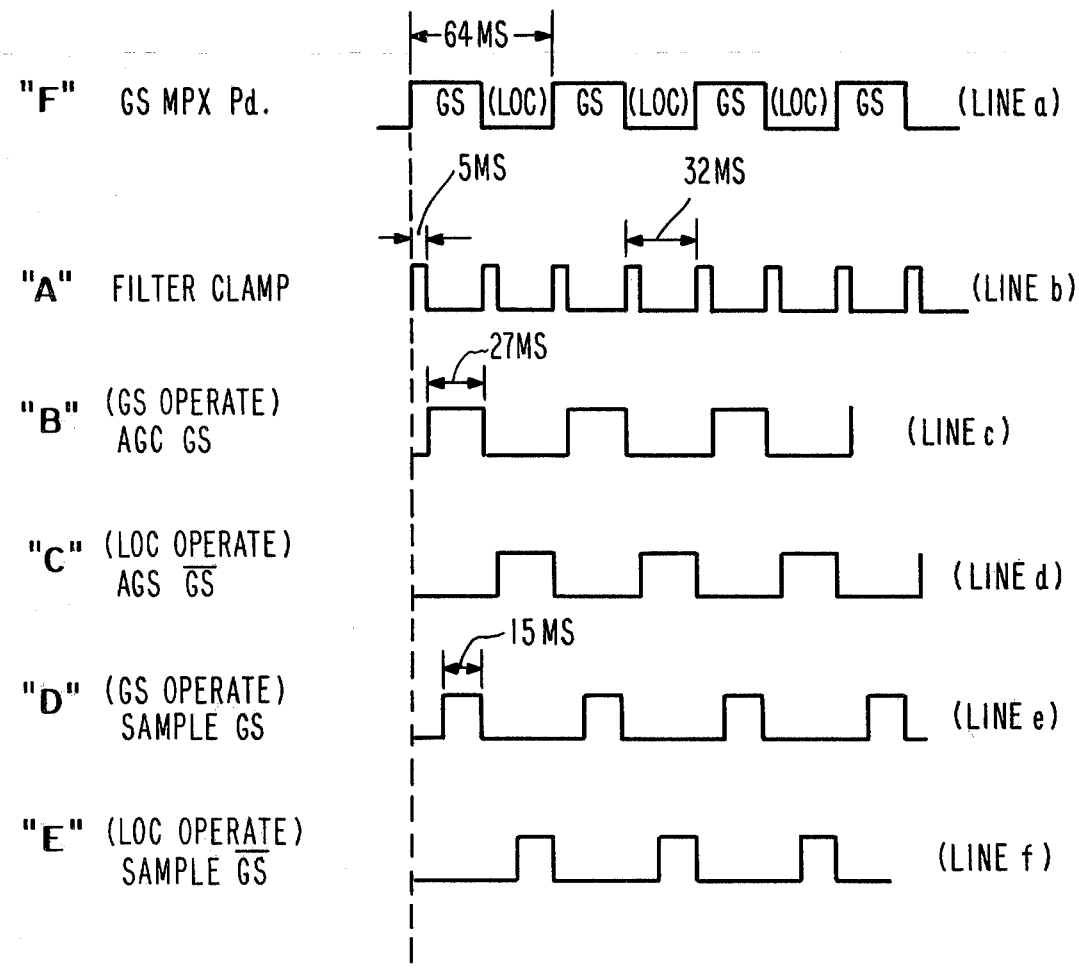
FIG. 2 is a timing diagram for the multiplex operation of the unit.

Command signals "A", "B", "C", "D", "E", and "F" generated by the multiplex control circuit 151 are each rectangular pulse train sequences as shown in FIG. 2. The GS signal "F", line "a" of FIG. 2 defines a duty cycle for the processing of localizer and glide slope information as well as total multiplex period. Line "a" shows a 50% duty cycle for localizer and a 50% duty cycle for glide slope processing. A single total multiplex period is 64 milliseconds and was decided upon as a function of the design constraints imposed upon the system regarding information rates received as VOR, LOC, and GS signals, the capacities and speed of electronic components generally available, and the amount of electronic hardware permitted by the size and weight specifications for the unit.

Line "b" illustrates the filter clamp command "A", a series of five milliseconds pulses occurring at the beginning of each individual processing portion of the total multiplex period. These five milliseconds clamp pulses inhibit the processing of information during the first five milliseconds after a changeover between the LOC and GS processing modes. This allows for a five millisecond settling out time during which switching transients and other noise generated within the system are permitted to settle out and the system is reset to zero including the draining of charge from tone filter capacitors therein.

Lines "c" and "d" illustrate the command signals "B" and "C" respectively. These signals are used to control the dedication of the multiplex or common intermediate "components" within the navigational unit. As can be seen from FIG. 2 the AGC GS and AGC $\overline{GS}$ (LOC) signals are present during the entire remaining 27 milliseconds in the GS or LOC portions of a multiplex time period.

Lines "e" and "f" of FIG. 2 illustrate the commands "D" and "E", respectively, i.e. the commands for sampling GS information and sampling $\overline{GS}$ (LOC) information, respectively. It can be seen that these commands are present during the last 15 milliseconds of each respective GS and LOC processing time. The discontinuity of approximately 12 milliseconds allows for the intermediate components which have been switched over from processing one type of information to the other type to "build up", i.e. eliminate switching transients and fully sink into the new information processing mode while allowing time for correction of any saturation conditions which may have occurred upon switching. A safe 15 millisecond sample period is therefore reserved for obtaining GS and LOC navigational information for driving the respective navigational displays.

While in the embodiment presented herein VOR and LOC information is received on a common antenna 101 and processed through a separate RF amplifier 103 and mixer 105 before being fed to the common IF filter 107, and GS information is received on a separate antenna 135 and fed to a separate amplifier 137 and mixer 139 before being transmitted to the common IF filter 107, a multiplexed front end could easily be incorporated into the design. In such instance a compound antenna would feed a single RF amplifier and single RF mixer. The function of such a single RF amplifier and mixer could be enhanced to handle both the VOR/LOC and GS information received from the single compound antenna. Such a processing would be handled on a time-shared, multiplex bases and be controlled by multiplex control signals from the control circuitry 151.

The LOC mixer 105 is normally tuned to 40 channels within the 108 to 112 MHz range, while the GS mixer 139 is tuned to 40 channels within the 329 to 335 MHz range. The frequency synthesizer 147 switches a control signal to the voltage control oscillator 149 to change a local oscillator injection frequency between the LOC and GS ranges as a function of the sample command "D" received from the multiplexed control circuit 151. This L.O. injection frequency is 17 MHz below the LOC channel frequency. Although the glide slope L.O. frequencies are 312 through 318 (17 MHz below 329 through 335), the synthesizer 147 operates at ⅓ the frequency (101 through 106 MHz), which means that the VCO mixer 105 operates within the VHF region for both outputs. The GS mixer 139 operates at triple the VCO 149 frequency, which is the 312 through 318 MHz UHF range. The GS mixer 139 is normally nonlinear and generates a third harmonic for the synthesizer frequency.

Figure 3:
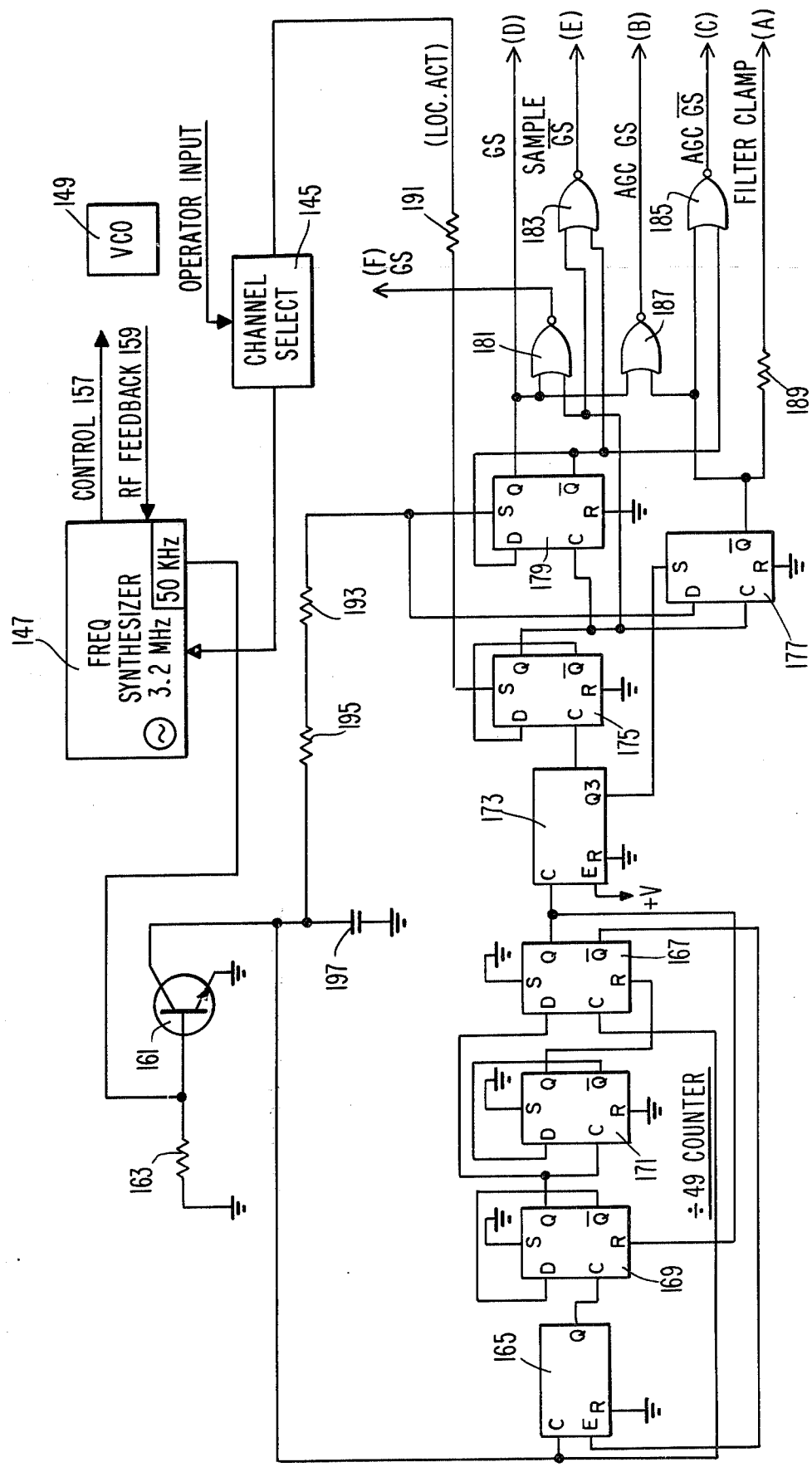
FIG. 3 is a circuit diagram of the multiplex control component of the unit.

The structure of the timing and control circuit 151 as well as its interconnection to the rest of the receiver is shown in greater detail in FIG. 3. The basic switching control operation of the timing and control circuitry 151 is derived from a 50 KHz clock signal provided by the frequency synthesizer 147 which contains a 3.2 MHz crystal oscillator. The frequency synthesizer 147 also provides a control signal 157 to operate the voltage controlled oscillator (VCO) 149. VCO 149 provides an RF feedback signal 159 to the frequency synthesizer 147.

The 50 KHz signal received by the timing and control circuitry 151 is divided down by a divide by 49 counter and a divide by 16 counter within the timing and control circuitry 151 to provide a basic 15 Hz signal for generating the command signals "A", "B", "C", "D", "E" and "F". Specifically, FIG. 3, a connection from the 50 Hz output of the frequency synthesizer 147 to the base of a type 2N5134 transistor 161. The transistor 161 has its emitter tied directly to ground and its base tied to ground through a 10K resistor 163. The collector of transistor 161 is connected to the clock input of a first type 4520 up-counter 165 and to the clock input of a first D-type flip flop 167. The "$\overline{Q}$" output of this first D-type flip flop 167 is connected to the "E" input of the first up-counter 165. The "Q" output of this first counter 165 is connected to the "clock" input of a second D-type flip flop 169 while the "R" input to the up-counter 165 is connected to ground. Second D-type flip flop 169 has its "set" input tied to ground and its "$\overline{Q}$" output tied to its "D" input. The "Q" output of this second flip flop 169 is connected to the clock input of a third D-type flip flop 171 and to the "D" input of the first flip flop 167. The "set" inputs to both the first and third flip flops 167 and 171 are connected to ground as well as is the "reset" input to the third flip flop 171. The "$\overline{Q}$" output of the third D-type flip flop 171 is connected to its "D" input while the "Q" output is connected to the "reset" of the first flip flop 167. The "Q" output of the first flip flop 167 is connected to the reset input of the second flip flop 169 and to the "clock" input of a second up-counter 173.

Up-counter 173 has its "E" input tied to the common logical "high", its "R" input tied to ground and its "Q" output tied to the "clock" input of a fourth D-type flip flop 175. The "Q3" output of the up-counter 173 is connected to the set input of a fifth D-type flip flop 177.

The "$\overline{Q}$" output of the fourth flip flop 175 is connected to its "D" input while the "Q" output of this flip flop 175 is connected to the "clock" input of the fifth flip flop 177 and to the "clock" input of a sixth D-type flip flop 179 as well as to one input of a two-input NAND gate 181. This first NAND gate 181 has its other input connected to the "Q" output of the sixth flip flop 179. Flip flop 179 has its "$\overline{Q}$" output connected to the "D" input as well as one input of a second two-input NAND gate 183 and a third two-input NAND gate 185. The "reset" input to the fifth flip flop 177 is connected to ground as is the "reset" input for the fourth flip flop 175 and the sixth flip flop 179. The "$\overline{Q}$" output of the fifth flop flop 177 is connected directly to one input of a fourth two-input NAND gate 187 and the other input of the third two-input NAND gate 185. The output of this third NAND gate 185 forms the "C" command signal (AGC-$\overline{GS}$). The Q output of this fifth flip flop 177 through a 100 KOhm series resistor 189 forms the signal command "A" (filter clamp). The Q output of the sixth flip flop 179 forms the "D" command signal (GS) and is also connected to the other input of the first two-input NAND gate 181 and the other input of the fourth two-input NAND gate 187.

The output of the second NAND gate 183 forms the "E" command signal (sample $\overline{GS}$), while the output of the fourth NAND gate 187 forms the "B" command signal (AGC-GS) and the output of the first NAND gate 181 forms the GS command "F".

The LOC actuation signal line coming from the synthesizer 147 is connected to the "set" input of the fourth flip flop 175 through a 100 KOhm resistor 191. The "set" input of the sixth flip flop 179 and the "D" input of the fifth flip flop 177 are connected in common through a 47 KOhm resistor 193 and a 15 KOhm resistor 195 to the collector of the transistor 161. This collector of transistor 161 is also connected to ground through a 100 picofarad capacitor 197.

Figure 4:
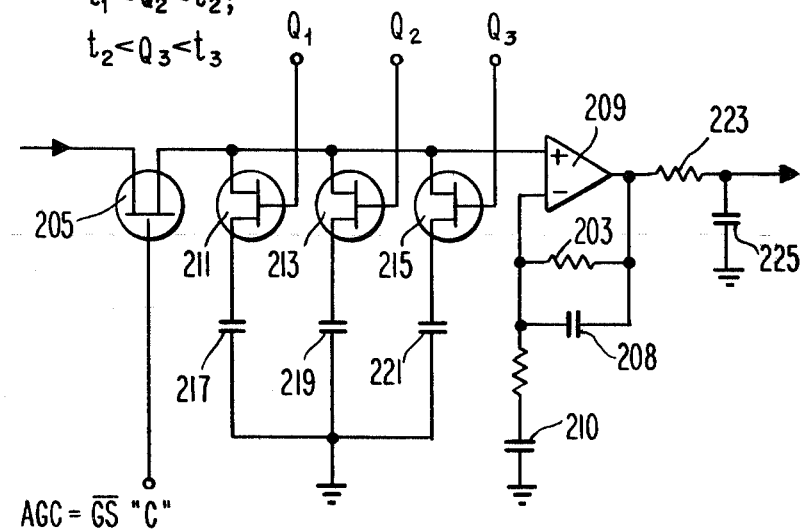
FIG. 4 is a circuit diagram of the basic tone identification and reconstitution circuit.

Tone identification and reconstitution circuit 118 is shown in greater detail by FIG. 4. Incoming signals are passed through gate 205 which gate 205 is connected to pass information in the presence of the AGC $\overline{GS}$ command "C" as provided by the multiplex control circuit 151. During a glide slope information processing portion of a multiplex cycle this gate 205 is open. This information is stored on three storage capacitors 217, 219 and 221 tied in common between the output of the gate 205 and ground. A second, third and fourth switches 211, 213 and 215 are positioned one each intermediate the output of the gate 205 and one each of the respective capacitors 217, 219 and 221. The operation of these switches 211, 213 and 215 are each controlled to sequentially gate to each of the capacitors 217, 219 and 221 in turn, tone information passed through the first gate 205 during the command "C" 27 millisecond processing time.

Switching control signals Q1, Q2, and Q3 are applied to the switches 211, 213 and 215 respectively. Each control signal directs the operation of its associated switch to permit a build up of charge (information) on each of the storage capacitors 217, 219 and 221 for an equal portion of the 27 millisecond sampling period. Each of the capacitors 217, 219 and 221 is required to hold 9 milliseconds worth of information equal to the average value of the tone signal that capacitor saw during its particular 9 millisecond sampling portion of the AGC $\overline{GS}$ time period.

During a glide slope processing portion of a multiplex cycle, the gates 211, 213, and 215 continue to be sequentially closed for an equal, one third portion, of the time period enabling the capacitors 217, 219, and 221 to be sequentially sampled as to the voltage stored via an amplifier 209.

Amplifier 209 which has its positive input terminal connected to the output of the gate 205 samples the stored memory voltages from the capacitors 217, 219, and 221.

A low pass filter, comprising 3.2 KOhm resistor 223 and a 0.1 microfarad capacitor 225 connected to ground, is connected to the output of the amplifier 209. Amplifier 209 also has the parallel connection of a 100K Ohm resistor 203 and a 0.01 microfarad capacitor 207 connected between its output and its negative input terminals. While the negative input terminal of the amplifier 207 is also connected to ground through the series connection of a 8.2K Ohm resistor 208 and a 0.1 microfarad capacitor 210.

Figure 5:
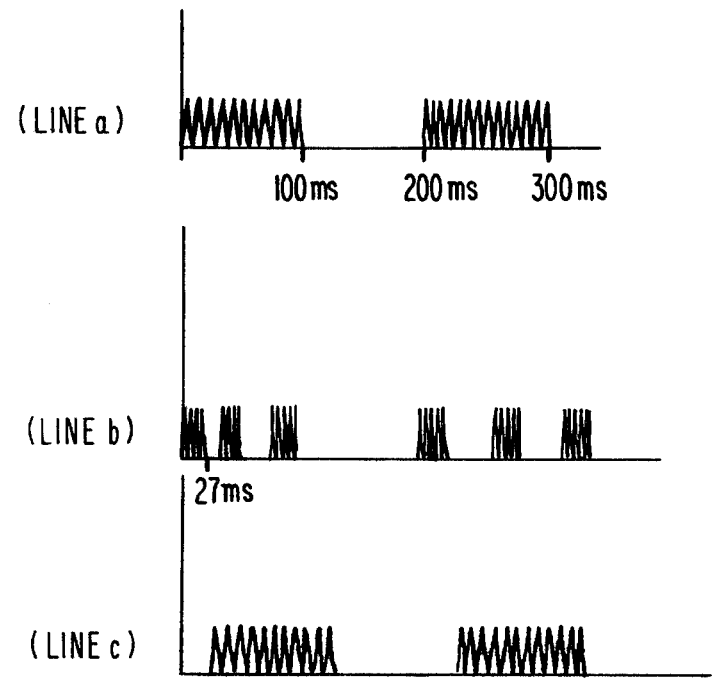
FIG. 5 is a timing diagram for the operation of the tone circuit in which tone pulses are reconstituted.

The reconstitution operation by this circuit is illustrated in FIG. 5 where line "a" shows Morse Code "dots" which have been transmitted by the station as part of its identification signal. Each dot is a hundred millisecond pulse burst of 1020 Hz energy. Line "b" shows discontinuous portions of this tone which are processed through the intermediate portions of receiver during the localizer portion of a multiplex cycle. Without reconstitution the audio signal presented to the pilot would be unintelligible.

Line "c" shows the reconstituted dots having the missing tone portions filled in by the reconstitution circuit.

During the time the system is receiving LOC (AGC GS, 27 milliseconds) the audio from the receiver is applied to the three phase sampling filter. A received tone, close to the sampling frequency, will build three voltage amplitudes across the storage capacitors 217, 219, 221. Other frequencies or noise tend to cancel out. The result is a three step wave form applied to the buffer/low pass filter resulting in a relatively clean tone across the output capacitor 225. This then functions as an analog narrow band filter.

However, during the remainder of the system time (36 milliseconds) the audio from the receiver is blocked from the filter by the switch 205. Whatever level of tone present on the capacitors 217, 219 and 221 (as represented by voltage value) at the end of receiving LOC (AGC GS) is retained, and the same level of tone continues to be produced at the output capacitor 225. If a VOR (not an ILS) frequency is selected, the entire switch and filter system is bypassed.

While the navigational unit described herein is directed to the preferred embodiment of the invention, changes can be made in this embodiment without departing from the spirit and scope thereof. This disclosure, therefore, should be considered in its intent, as illustrative, and should not be taken as all encompassing or in a limiting sense.

What is claimed is:

1. A navigational receiver capable of receiving more than one signal and processing them on a time-shared multiplexed basis for providing simultaneous displays of various navigational information as well as a simultaneous output of station identification Morse Code signal tones, from at least one station, comprising:
   antenna means for receiving said signals including at least one superimposed station identification tone;
   front end means including mixer means for preliminarily handling said signals received by said antenna means, said preliminarily handling means being connected to said antenna means;
   intermediate signal processing means for time-shared handling of signals received from said front end means;
   means, responsive to said intermediate signal processing means, for selectively displaying navigation information wherein navigation information is simultaneously displayed;
   audio means, responsive to said intermediate signal processing means for amplifying and passing audio information being at least one superimposed station identification tone received from said intermediate processing means; and
   means, responsive to said audio means for reconstituting said superimposed station identification tones, containing discontinuities resulting from time-shared operation of said intermediate signal processing means.

2. The receiver of claim 1 wherein said time-shared operation of said intermediate signal processing means is on a multiplexed basis, said means being repetitiously and alternately dedicated to the handling of LOC and GS signals including LOC superimposed station identification tones wherein a LOC signal processing time is established and a GS signal processing time is established.

3. The receiver of claim 2 wherein said reconstituting means includes:
   means for accepting only valid LOC station identification tones said means being connected to said audio information amplifying and passing means; and
   means for remembering said valid tones being accepted and for passing on said remembered valid tones in the absence of valid tones being accepted, said remembering and passing on means being responsive to said accepting means.

4. The receiver of claim 3 wherein said accepting means includes means for accepting said identification tones only during said LOC signal processing time.

5. The receiver of claim 4 wherein said remembering and passing on means includes:
   gating means;
   output means for amplifying said valid identification tones, said output amplifying means being connected to said gating means;
   a plurality of means for storing valid tone information; and
   distribution means for selectively and sequentially connecting each of said plurality of storage means to said gating means during said LOC signal process time and to said output amplifying means.

6. The receiver of claim 5 also including tone quality improvement means connected on the output of said output amplifying means.

7. The receiver of claim 6 wherein said plurality of storage means includes a plurality of storage capacitors.

8. The receiver of claim 7 wherein said distribution means includes a plurality of selectively operated gates being connected, one each to a respective one of said storage capacitors, and, each to said gating means and said output amplifying means.

9. The receiver of claim 2 wherein said reconstituting means includes gated digital filter means for performing multiphase amplitude sampling, said gated digital filter means being connected to said audio means.

* * * * *

UNITED STATES PATENT OFFICE
CERTIFICATE OF CORRECTION

Patent No. 4,184,157                    Dated January 15, 1980

Inventor(s) Frank Patterson Smith, 2nd

It is certified that error appears in the above-identified patent and that said Letters Patent are hereby corrected as shown below:

Column 4, line 27, "GS" should read -- $\overline{GS}$ --

Column 4, line 27 "$\overline{E}$" should be -- E --

Column 6, line 60 "100 KOhm" should be --100K Ohm--

Column 7, line 5 "100 KOhm" should be --100K Ohm--

Column 7, line 8 "47 KOhm" should be --47K Ohm--

Column 7, line 8 "15 KOhm" should be --15K Ohm--

Column 7, line 51 "3.2 KOhm" should be --3.2K Ohm--

Signed and Sealed this

Fifteenth Day of July 1980

[SEAL]

Attest:

SIDNEY A. DIAMOND

Attesting Officer          Commissioner of Patents and Trademarks